Feb. 9, 1943.    E. W. GENT    2,310,417
PNEUMATIC TICKET SENDING AND RECEIVING VALVE
Filed Jan. 28, 1942    2 Sheets-Sheet 1

INVENTOR
E. W. GENT
BY J. MacDonald
ATTORNEY

Feb. 9, 1943. E. W. GENT 2,310,417
PNEUMATIC TICKET SENDING AND RECEIVING VALVE
Filed Jan. 28, 1942 2 Sheets-Sheet 2

INVENTOR
E. W. GENT
BY J. MacDonald
ATTORNEY

Patented Feb. 9, 1943

2,310,417

UNITED STATES PATENT OFFICE 2,310,417

PNEUMATIC TICKET SENDING AND RECEIVING VALVE

Edgar W. Gent, Morristown, N. J., assignor to Bell Telephone Laboratories, Incorporated, New York, N. Y., a corporation of New York Application January 28, 1942, Serial No. 428,559

6 Claims. (Cl. 302—2)

This invention relates to pneumatic ticket distributing systems and more specifically to combined roller ticket sending and receiving valves used in such system.

The object of the invention is to improve the construction and operation of such pneumatic ticket sending and receiving valves while decreasing their upkeep and manufacturing costs.

In accordance with this invention, a combined roller ticket receiving and sending valve is provided in which a base serves for securing a pair of mounting plates formed with bearings for the shaft of a driving roller and means for receiving independent ring-shaped members of resilient material into which bearings for the shafts of two driven rollers are embedded. The driven rollers are held in frictional engagement with the driving roller by the elasticity of the rings while means is provided at the periphery of the rings for permitting a greater degree of axial displacement of the driven roller shafts relative to the driving roller shaft upon the passing of the tickets between the driving and the driven rollers, the driving roller being disposed in a row with the driven rollers at a point equidistant therefrom.

Ticket receiving and sending tube sections fitted into a head-piece are provided with means to form with the latter an air by-pass leading from the ticket receiving tube section to the ticket sending tube section, these tubes extending in juxtaposition to the engaged point of the driven rollers with the driving roller, one tube guiding the received ticket between the engaged point of one of the driven rollers with the driving roller to be delivered to a rack secured to the base and extending through a mounting board at the operator position, while guiding means carried by the base is provided to facilitate the inserting of a ticket between the driving and the other driven roller for dispatching such ticket into the sending tube for delivery through the medium of the stream of air into a second receiving valve connected at the opposite end of the pneumatic tube.

Means in the form of spring-pressed bars is provided to form air seals between the driven rollers and the ticket guiding receiving and sending tubes, such means cooperating with plates of antifriction material to form air seals adjacent the ends of the driving and the driven rollers and the mounting plates.

Means formed with one of the mounting plates serve for securing a motor in operative relation with the shaft of the driving roller with means provided for resiliently coupling the motor shaft to the driving roller shaft.

Other novel features and advantages of the invention will appear from the following description and by the claims appended thereto, reference being had to the accompanying drawings in which:

Figure 1:
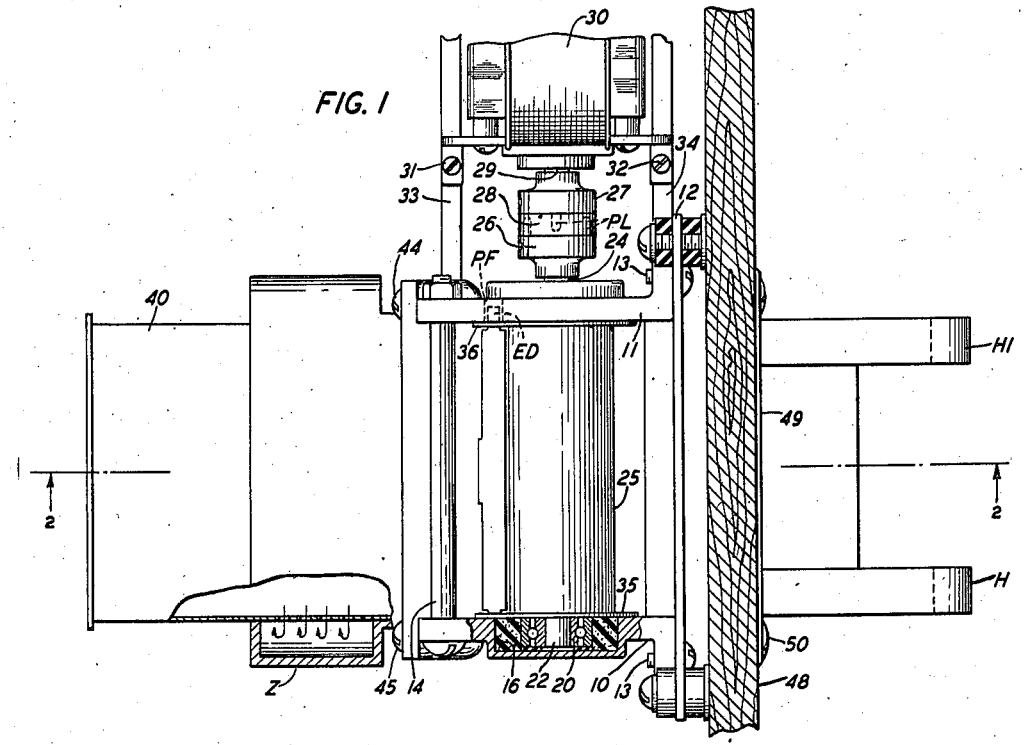
Fig. 1 is a top assembly view shown with a number of operating parts in section.

Referring to the drawings, a pair of supports 10 and 11 are secured to a metallic mounting plate or base 12 as by a plurality of screws 13, while at their free ends these supports are held in adjusted spaced relation by a pair of spacer members 14 and 15. The supports 10 and 11 are each formed with a pair of circular recesses as 16 and 17 shown in Figs. 1 and 2 provided for receiving rubber rings 18 and 19 into which are embedded roller bearings such as 20 shown in Fig. 1 for rotatably mounting the shafts 21 and 22 on which the rollers 23 and 25, respectively are keyed.

The shafts 21 and 22 are disposed equidistant from a shaft 24 on which the roller 24Y is keyed. Shaft 24 is journaled in ordinary bearings formed with the supports 10 and 11 with one end of this shaft as shown in Fig. 1 extending a small distance from the support 11 for mounting a coupling element 26 operatively connected to its complement coupling element 27 through pins PL extending from coupling elements 26 and 27 into perforations in a ring 28 of non-metallic material such as rubber, the coupling element 27 being keyed on the armature shaft 29 of an electric motor 30 secured as by a plurality of screws 31 and 32 to the bracket 33 and 34 shown in Figs. 1 and 3 formed with the support 11.

A pair of plates 35 and 36, best seen in Figs. 1 and 2, of antifriction material are placed between the ends of rollers 23, 24Y and 25 and the ends of two graphite bars 37 and 38 and the inner disposed surfaces of supports 10 and 11 for a purpose which will be hereinafter described in detail.

Figure 2:
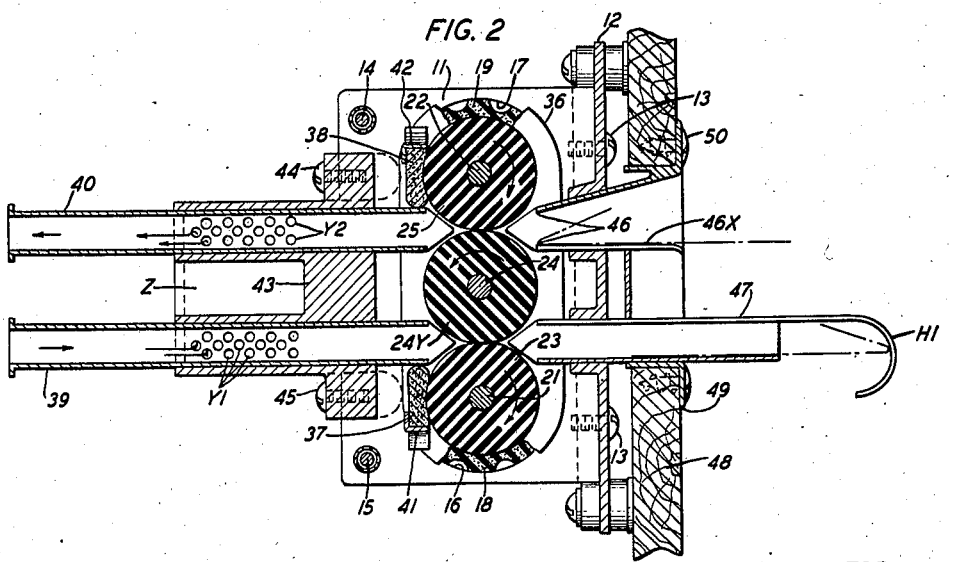
Fig. 2 is a longitudinal sectional view taken on line 2—2 of Fig. 1.

The graphite bars 37 and 38 are held in frictional engagement with rollers 23 and 25 and in abutment with the outer disposed sides of ticket receiving and sending tube sections 39 and 40 by bowed springs 41 and 42 so as to form air seals between these rollers and the tubes, the ends ED of springs 41 and 42, as shown in Fig. 1, engaging the perforation PF in the supports 10 and 11.

Figure 3:
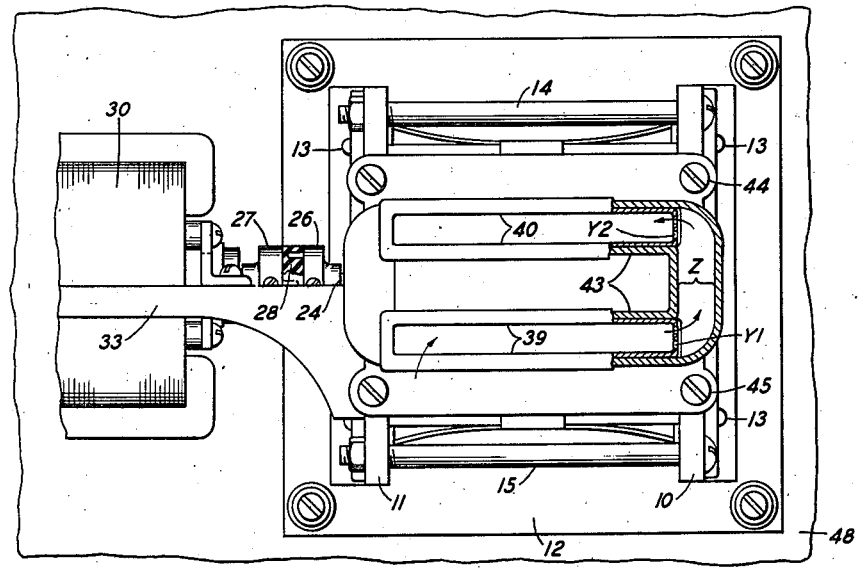
Fig. 3 is an end view shown with a number of operating parts with portions broken away.

The ticket sending and receiving tube sections 39 and 40, which are made of transparent material, are mounted into a head-piece 43 of Lucite secured to the supports 10 and 11 by a plurality of screws 44 and 45 shown in Figs. 1, 2 and 3. The ticket receiving tube section 39 extends in juxtaposition to the engaged point of driven roller 23 and the driving roller 24Y. This tube section is provided at its opposite narrow sides with series of perforations Y1 forming with the walls Z formed with the head-piece 43 an air by-pass leading into the ticket sending tube 40 through a series of perforations Y2 in tubing section 40, while a rack element 47 carried by the plate 12 is provided for receiving the ticket delivered by the operation of rollers 23 and 24Y, the rack 47 being in the form of a U-shaped channel member with hooked members H and H1 projecting therefrom for stopping the tickets in their transit from the valve. The end of sending tube section 40 extends in juxtaposition to the engaged point of rollers 25 and 24Y in coaxial alignment with a chute member 46 carried by the plate 12 and provided for guiding the ticket placed on the table formed by the strips 46X toward the engaged point of rollers 24Y and 25 to be delivered into the tubing section 40.

Figure 4:
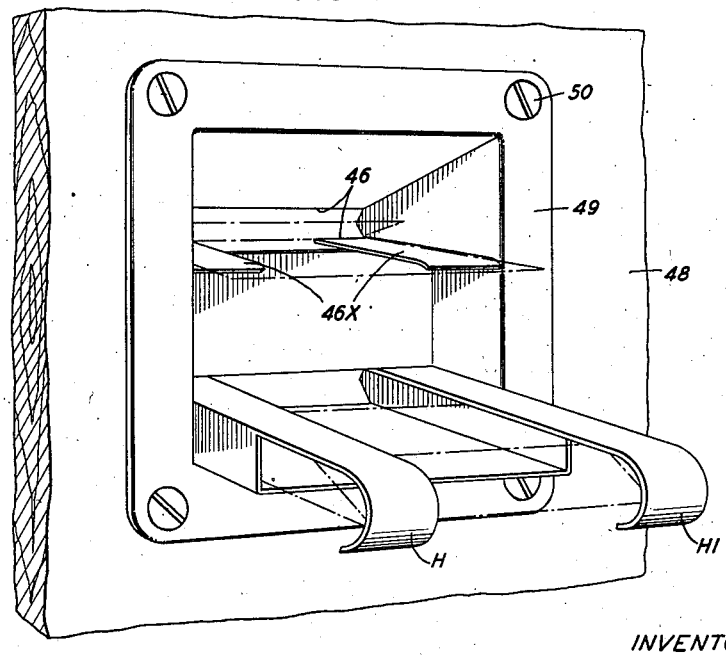
Fig. 4 is a view in perspective showing the receiving and sending end of the combined valve.

The ticket sending chute 46 and the ticket receiving rack element 47 extend through an opening in a board 48 fitted with a molding 49 shown in Figs. 1, 2 and 4 to the board 48 by a plurality of similar screws 50.

In the operation of the combined ticket receiving and sending valve of the invention, the operation of the motor 30 and thereby the rotation of roller 24Y operatively connected thereto is effective to rotate by friction the rollers 23 and 25 in the direction indicated by the arrows in Fig. 2 due to the contact pressure between the rollers 23 and 25 on roller 24Y exerted by the rubber rings 18 and 19, respectively. The ticket propelled by the air stream into a pneumatic tube (not shown) which may be connected to the tube section 39 of the valve, when coming into contact with the engaged point of rollers 23 and 24Y, is driven by the operation of the rollers onto the rack-like member 47 and stopped by the hook portions H and H1 of this rack in the position shown in dotted lines in Figs. 2 and 4 from which it may easily be manually removed. The stream of air continues in its path toward the ticket sending tube section 40 through the series of perforations Y1, the by-pass path formed in the head-piece 43 and the series of perforations Y2 leading into the ticket sending tube section 40, the air being prevented from escaping from between the roller 23 and the projecting end of tube section 39 by the graphite bar 37 held frictionally in contact with the roller 23 and in abutment with one side of tube 39 by the bowed spring 41.

The dispatching of a ticket is effected by placing the ticket on the table formed by the strips 46X of chute 46 and moving it as by a sliding movement thereon until engaged by the rollers 25 and 24Y rotating in the direction indicated by the arrow shown in Fig. 2, thus drawing the ticket into the tube section 40 which may be connected to a pneumatic tube (not shown), the stream of air propelling the ticket in this tube in the direction indicated by the arrow in Fig. 2. The escape of air between the roller 25 and the outer disposed side of tube 40 is prevented by the bar of graphite 38 held in frictional engagement with roller 25 and the side of tube 40 by the spring 42, the length of bars 37 and 38 being equal to the length of rollers 23, 25 and 24Y and each closely fitted between the plates 35 and 36 of antifriction material.

What is claimed is:

1. A combined ticket sending and receiving pneumatic valve comprising a motor, a roller operatively connected to said motor, other rollers rotated by the movement of the first-mentioned rollers, pneumatic tube sections, one of said sections leading the receiving ticket to the engaged point of the first with one of the second-mentioned rollers, the other of said sections receiving the sending ticket following its movement by the operation of the first-mentioned roller and the other of said rollers, and means forming air seals between said rollers and one side of each of said tube sections.

2. A combined ticket sending and receiving pneumatic valve comprising a motor, a roller operatively connected to said motor, other rollers, discs of resilient material for engaging the first-mentioned roller with the second-mentioned rollers to be frictionally rotated by the movement of the first-mentioned roller, pneumatic tube sections, one of said sections guiding the received ticket between the engaged point of the first-mentioned roller and one of said frictionally rotated rollers and a chute element for guiding the sending ticket toward the engaged point of the first-mentioned roller and the other of said rollers for driving the ticket into the other of said tube sections.

3. A combined ticket sending and receiving pneumatic valve, comprising a motor, a roller operatively connected to said motor, other rollers actuated by the operation of the first-mentioned roller and disposed in a row therewith, a pair of supports for said rollers, a mounting plate for securing said supports, spacer elements and a head-piece cooperating with said plate for holding said supports in adjusted spaced relation to each other, pneumatic tube sections fitted in said head-piece, an air path in one of said ticket receiving tube sections leading to an air path in said head-piece and the latter leading to an air path connecting with the other of said tube sections.

4. In a combined ticket sending and receiving pneumatic valve, a plurality of frictionally engaged rollers arranged in a row, a motor for actuating one of said rollers, a pair of supports for said rollers, a mounting plate for said supports, ticket receiving and sending tube sections disposed on one side of said rollers in said row extending in juxtaposition to the engaged points of said rollers, and ticket receiving and sending elements carried by said mounting plates disposed at the opposite side of said rollers and extending in juxtaposition with the engaged point of said rollers in axial relation with the first-mentioned receiving and sending tube sections.

5. A combined pneumatic ticket sending and receiving valve, comprising three rollers disposed in operative relation to each other, two of said rollers conjointly operating on the received ticket, a motor for actuating one of the last-mentioned rollers, the third of said rollers being disposed in coacting relation with one of said two rollers for conjointly operating on the sending ticket, receiving and sending tube sections extending in position adjacent the two engaged points of said rollers, a plurality of bars and spring means for holding said bars in frictional engagement with each of said driven rollers and said tube sections to form air seals therebetween.

6. In a combined ticket sending and receiving pneumatic valve, a driving roller, a plurality of driven rollers, a pair of resilient mountings for said driven rollers holding the latter in frictional engagement with the first-mentioned roller, a pair of supports for said driving and said driven rollers, a mounting for securing said supports in spaced relation to each other, means carried by said mounting for guiding and stopping the received ticket following its transit between said driving and one of said driven rollers and other means for receiving the ticket to be transmitted by the operation of said driving roller and the other of said driven rollers.

EDGAR W. GENT.